United States Patent [19]

Grube et al.

[11] Patent Number: 5,082,107
[45] Date of Patent: Jan. 21, 1992

[54] STORAGE CONVEYOR

[75] Inventors: Erwin Grube, Bielefeld; Walter Kuhlmann, Lage; Friedhelm Elges, Bielefeld, all of Fed. Rep. of Germany

[73] Assignee: Dürkopp Adler Aktiengesellschaft, Fed. Rep. of Germany

[21] Appl. No.: 575,408

[22] Filed: Aug. 29, 1990

[30] Foreign Application Priority Data

Sep. 2, 1989 [DE] Fed. Rep. of Germany ....... 3929156

[51] Int. Cl.⁵ .................................................. B65G 17/32
[52] U.S. Cl. ................................... 198/680; 198/465.4
[58] Field of Search ................ 198/465 H, 598, 680, 198/687.1

[56] References Cited

U.S. PATENT DOCUMENTS

| | | | |
|---|---|---|---|
| 2,769,728 | 11/1956 | Juvinall | 198/465.4 |
| 3,002,635 | 10/1961 | Holland, Jr. | 198/465.4 X |
| 3,164,245 | 1/1964 | Juengel | 198/465.4 X |
| 3,799,318 | 3/1974 | Dekoekkoek | 198/465.4 X |
| 4,880,105 | 11/1989 | Kasai et al. | 198/465.4 |
| 4,903,819 | 2/1990 | Heinold et al. | 198/465.4 |

FOREIGN PATENT DOCUMENTS

| | | |
|---|---|---|
| 1071002 | 12/1959 | Fed. Rep. of Germany . |
| 1227833 | 10/1966 | Fed. Rep. of Germany . |
| 2121087 | 12/1971 | Fed. Rep. of Germany . |
| 2310356 | 9/1973 | Fed. Rep. of Germany . |
| 2340806 | 3/1975 | Fed. Rep. of Germany ... 198/465.4 |
| 2537442 | 3/1977 | Fed. Rep. of Germany . |
| 2902724 | 8/1980 | Fed. Rep. of Germany . |
| 2924110 | 12/1980 | Fed. Rep. of Germany . |
| 3735607 | 5/1989 | Fed. Rep. of Germany . |
| 1169904 | 7/1985 | U.S.S.R. ................................ 198/680 |

*Primary Examiner*—Robert P. Olszewski
*Assistant Examiner*—James R. Bidwell
*Attorney, Agent, or Firm*—Ostrolenk, Faber, Gerb & Soffen

[57] ABSTRACT

A storage conveyor which has a loading point and a removal point and in which a removal device is arranged preceding (upstream from) the removal point. The removal device includes a separately driven removal belt which is arranged between the two major courses of the horizontally circulating conveyor chain. The removal belt is guided so that it passes from below the conveyor chain to above it. The hanger hooks which rest with their top region on the conveyor chain are engaged at their tip by the removal belt, lifted off the conveyor chain and transferred to a slide rail at the removal point which they engage at their top region, and along which they then slide under the action of gravity. The removal belt can be moved faster than the conveyor chain, so as to separate the hangers as they are being lifted off the conveyor chain. As a result of these features of the storage conveyor, it is possible to supply and remove the hangers in a straight line so that high throughput is possible.

13 Claims, 5 Drawing Sheets

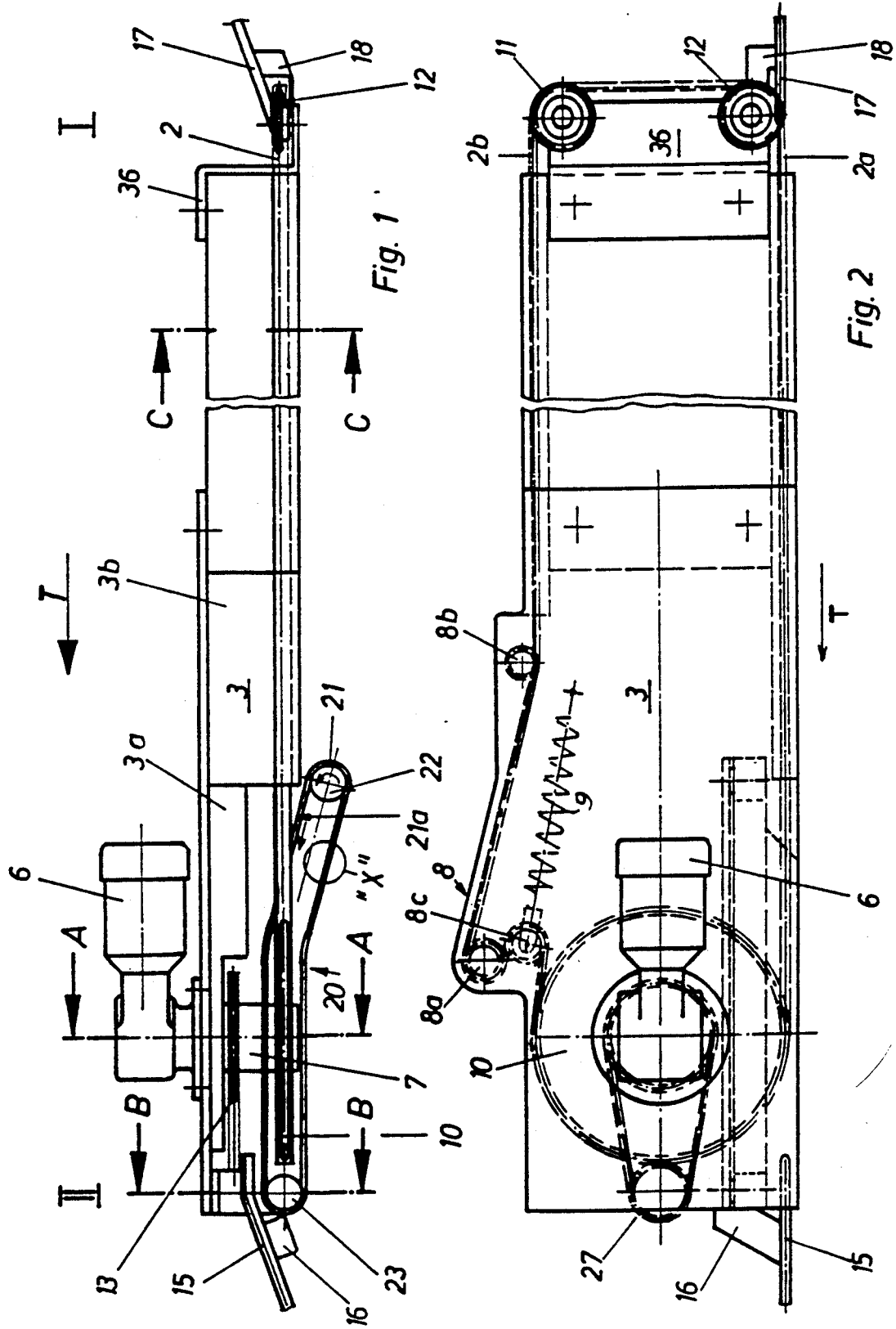

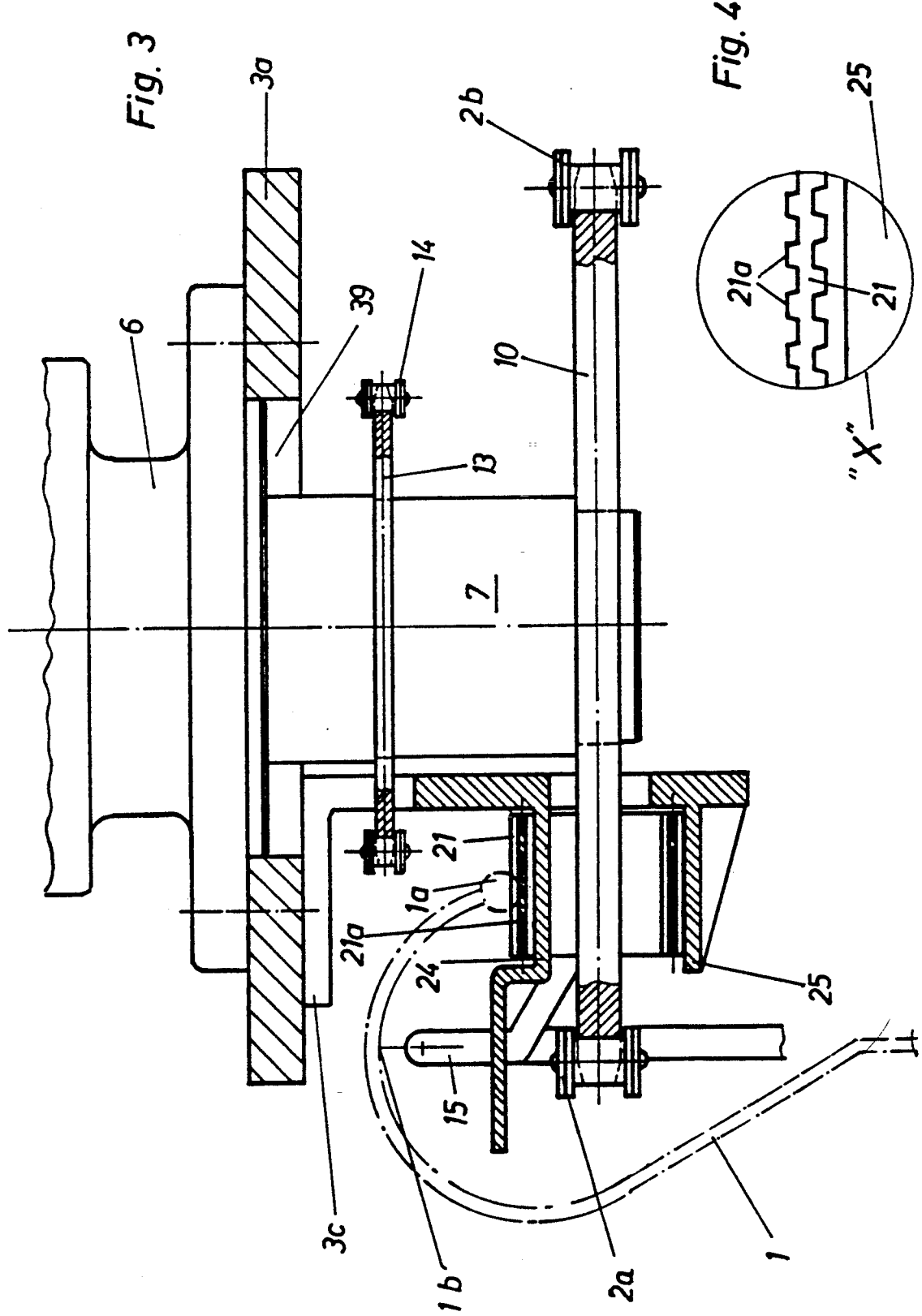

STORAGE CONVEYOR

CROSS-REFERENCE TO RELATED APPLICATION

This application is related to the commonly-assigned application of Erwin Grube et al., Ser. No. 07/575,384, filed on even date herewith, titled CONVEYOR which is incorporated by reference herein.

BACKGROUND OF THE INVENTION

1. Field of the Invention

The present invention relates to a storage conveyor for garments or articles hanging on clothes hangers, and more particularly to a storage conveyor having a novel hanger removal device at its removal point.

2. Background Art

It is generally considered unsatisfactory to store goods by hanging them on hangers, and then statically hang the hangers on shelf rods. In order to satisfy the increasing demand for dynamism and throughput, storage conveyors have been created by the use of various conveyor means. It is known, for instance, from Federal Republic of Germany OS 25 37 442 to hang material to be conveyed, hanging on clothes hangers, in a hanging carriage (a so-called trolley) which travels on rails, and then to store the trolleys on individual rail sidings, the trolleys being then transported to a transfer station or to the corresponding workplace when the material is needed.

It is also known from Federal Republic of Germany AS 12 27 833 to introduce the garments hanging on clothes hangers into a rotating spindle, the spindle serving as means for both transportation and storage, depending on whether the spindle is rotating at the time or not.

Both the trolley storage and spindle storage systems meet the demand for dynamism, but the trolley system has the disadvantage that only a limited number of articles can be stored on it and the number of articles which can be stored does not necessarily correspond to the number of articles in a batch which are required to be processed. The spindle system has the disadvantage that the points of intersection in the transfer and take-off region do not have the availability which is required for systems of this type since, in order to have sufficient strength, the spindles can only cover a limited storage length. Spindles which are too long would sag.

SUMMARY OF THE INVENTION

It is therefore the principal object of the invention to create a dynamic storage system which provides storage capacity which can accommodate any size lot of articles to be processed, which provides automatic transportation of articles hanging on hangers, and which permits almost unlimited storage length.

This object is achieved in a storage conveyor for storing articles hung on hangers which have hanger hooks, the conveyor comprising a driven conveyor chain, preferably horizontal, loading means at a loading point for feeding the hangers onto the conveyor chain in a direction of transport, with the hangers being hung on the conveyor chain substantially at the top region of their hooks above their center of gravity; and removal means at a removal point for removing hangers from the storage conveyor, the removal means raising the hangers continuously off of the conveyor chain, while maintaining their previous direction of advance and at least maintaining their previous rate of advance. Thus the removal means places the hangers in a position to be removed from the storage conveyor, preferably by transferring them to a slide rail adjacent to the removal means.

Advantageously, the removal means increases the rate of advance of the hangers after raising them off the conveyor chain, thereby increasing separation between the hangers.

According to a particularly preferred embodiment of the invention, the removal means has a conveyor belt, and pinions for supporting and driving the conveyor belt in the direction of transport, an upper course of the conveyor belt being conducted obliquely from below the conveyor chain to above the conveyor chain. The conveyor belt is guided adjacent to a portion of the conveyor chain at an engagement point, and is guided so that it engages the tip of each hanger hook at the engagement point and thereby lifts such hanger off the conveyor chain and onto the conveyor belt. Then the conveyor belt continues past the engagement point in the direction of transport, then moves horizontally in a plane lying above the conveyor chain, and subsequently descends to below the slide rail and transfers the hangers to the slide rail.

The conveyor belt is preferably toothed on at least one side, which engages the hanger hooks, and more preferably on both sides, enabling the conveyor belt to reliably engage both the hanger hooks and the drive pinions.

The conveyor chain is preferably a conventional roller chain.

The storage conveyor of the invention makes it possible for the loading device to extend in a straight line along the direction of storage, whereby problems caused by changes in direction upon the loading are avoided.

At the same time, trouble-free removal of hangers from the storage conveyor is possible since the hangers are held by the top region of their hanger hooks while being stored, but are removed by engagement of the tip of the hanger with a toothed belt or similar means. The toothed belt lifts the region of the tip of the hanger so that the hanger is gently lifted out of the storage conveyor.

The removal can take place at greater speed than the normal movement of the hangers while stored, in order to separate any stored hangers which are bunched together.

It is furthermore possible to have the loading of the articles to be stored take place cyclically, while the emptying of the conveyor can take place cyclically or continuously.

DESCRIPTION OF THE DRAWINGS

Other objects, features and advantages of the invention will be understood from the following detailed description of one embodiment thereof, with reference to the drawings, in which:

FIG. 1 is a simplified side view of the storage conveyor;

FIG. 2 is a top view of the storage conveyor of FIG. 1;

FIG. 3 is a section taken along line A—A of FIG. 1;

FIG. 4 is an enlargement of region "X" of FIG. 1;

DETAILED DESCRIPTION OF A PREFERRED EMBODIMENT

Figure 6:
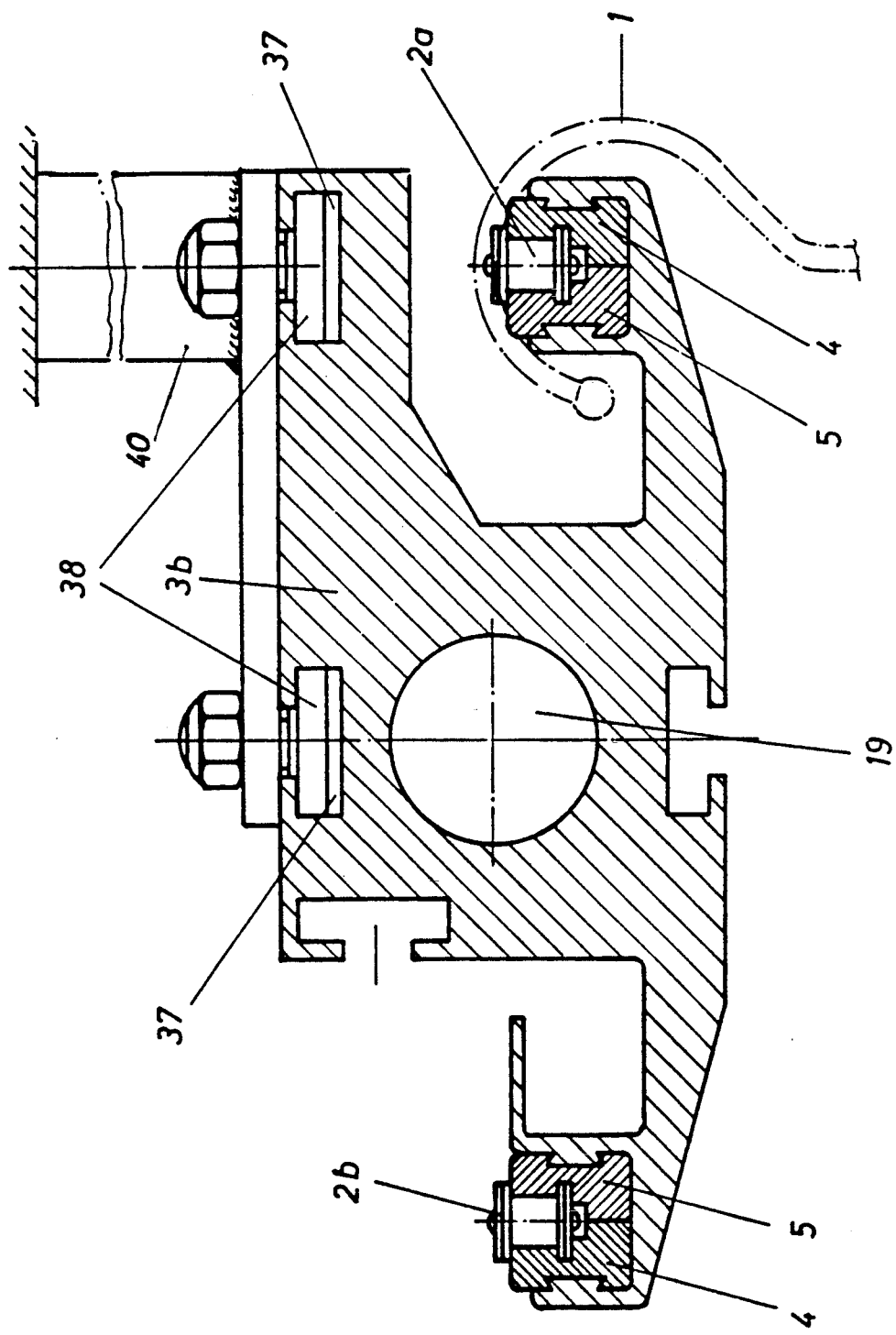
FIG. 6 is a section taken along line C—C of FIG. 1.

Referring particularly to FIGS. 1, 2 and 6, a conveyor chain 2 is guided in slide rails 4, 5 in the base member 3 of the storage conveyor. The slide rails 4, 5, are made of plastic and are form-locked in the base member 3. The conveyor chain 2, which is advantageously an ordinary commercial roller chain, travels around horizontally in the direction of transport T (FIG. 1), supported and guided on a sprocket wheel 10 arranged in front (upstream) of the removal point II, and on two guide pinions 11, 12 arranged on both sides of the base member 3 at the loading point I.

The base member 3 comprises modular parts 3a, 3b, which can be connected to each other. Several of the modular body parts 3b (FIG. 6) can be connected one behind the other so as to obtain a storage conveyor of any suitable structural length. Only one modular head part 3a, which forms the head part of the base member, is required for each conveyor, and is arranged at the removal point II.

At the head end, a drive motor 6 is flange-mounted on the head part 3a, the drive shaft 7 of said motor passing through a hole 39 (FIG. 3) provided in the head part 3a and bearing the sprocket wheel 10, as well as a drive gear 13 which will be explained in further detail below.

The modular head part 3a has a smaller vertical dimension than the body parts 3b in order to create sufficient space for the sprocket wheel 10 and drive gear 13.

Illustrated at the top of FIG. 2 is a return course 2b of the conveyor chain 2 on one side of the base member 3. This course 2b is opposite to the side of the conveyor chain 2 at the bottom of FIG. 2, which will be referred to as the conveyor course 2a. In the course 2b is integrated a chain tensioning device 8 which consists of two fixed pinions 8a, 8b which are arranged in fixed positions, and a movable pinion 8c which is biased by a tension spring 9. The pinions 8a, 8b, 8c are arranged following the sprocket wheel 10 in the direction of passage of the conveyor chain 2, so that the conveyor chain 2 forms the shape of an "s" as it engages around the pinions 8c, 8a. The spring-loaded pinion 8c provides a continuous tensioning force which tensions the chain 2.

Figure 5:
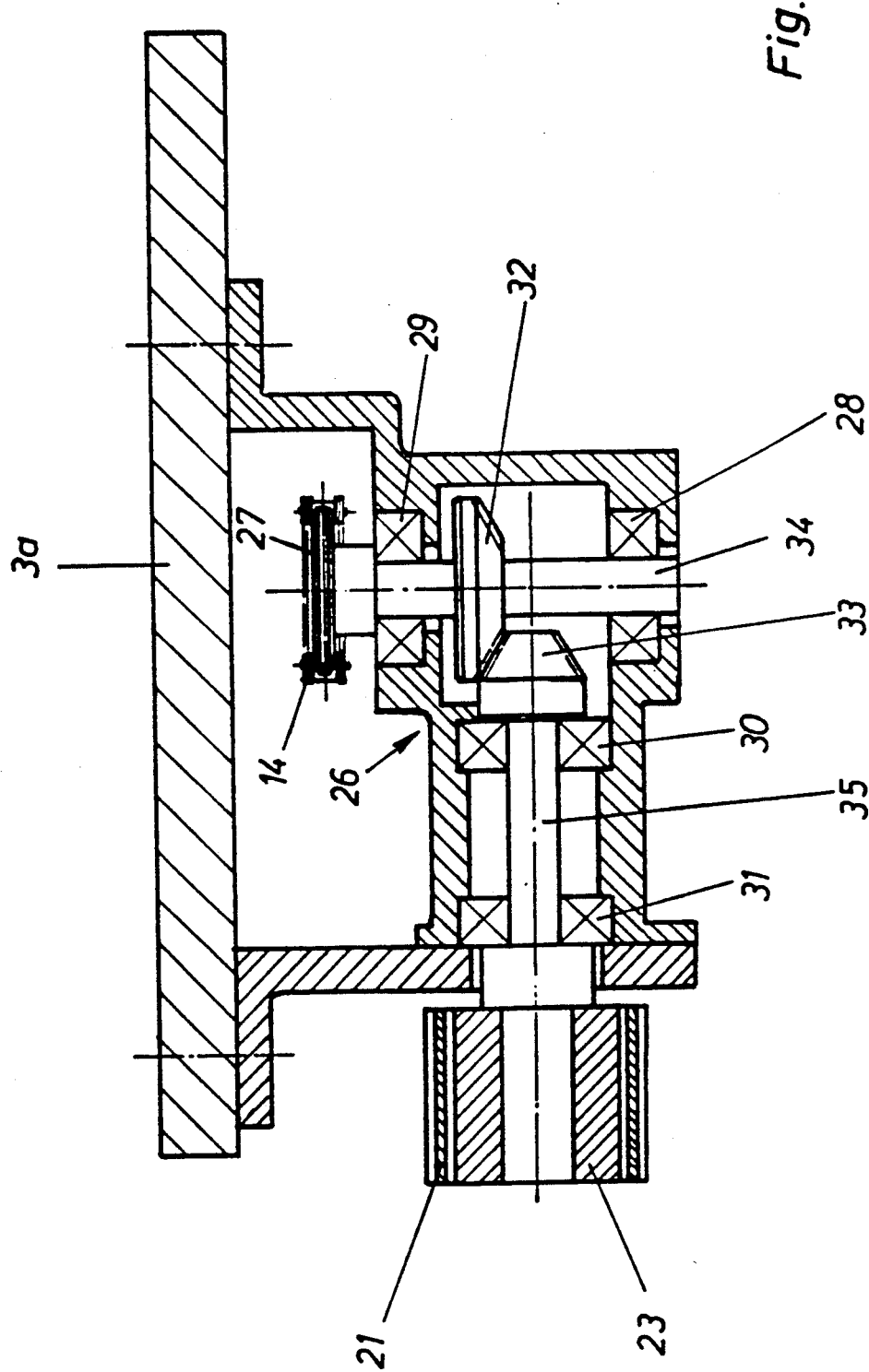
FIG. 5 is a section taken along line B—B of FIG. 1.
Figure 7:
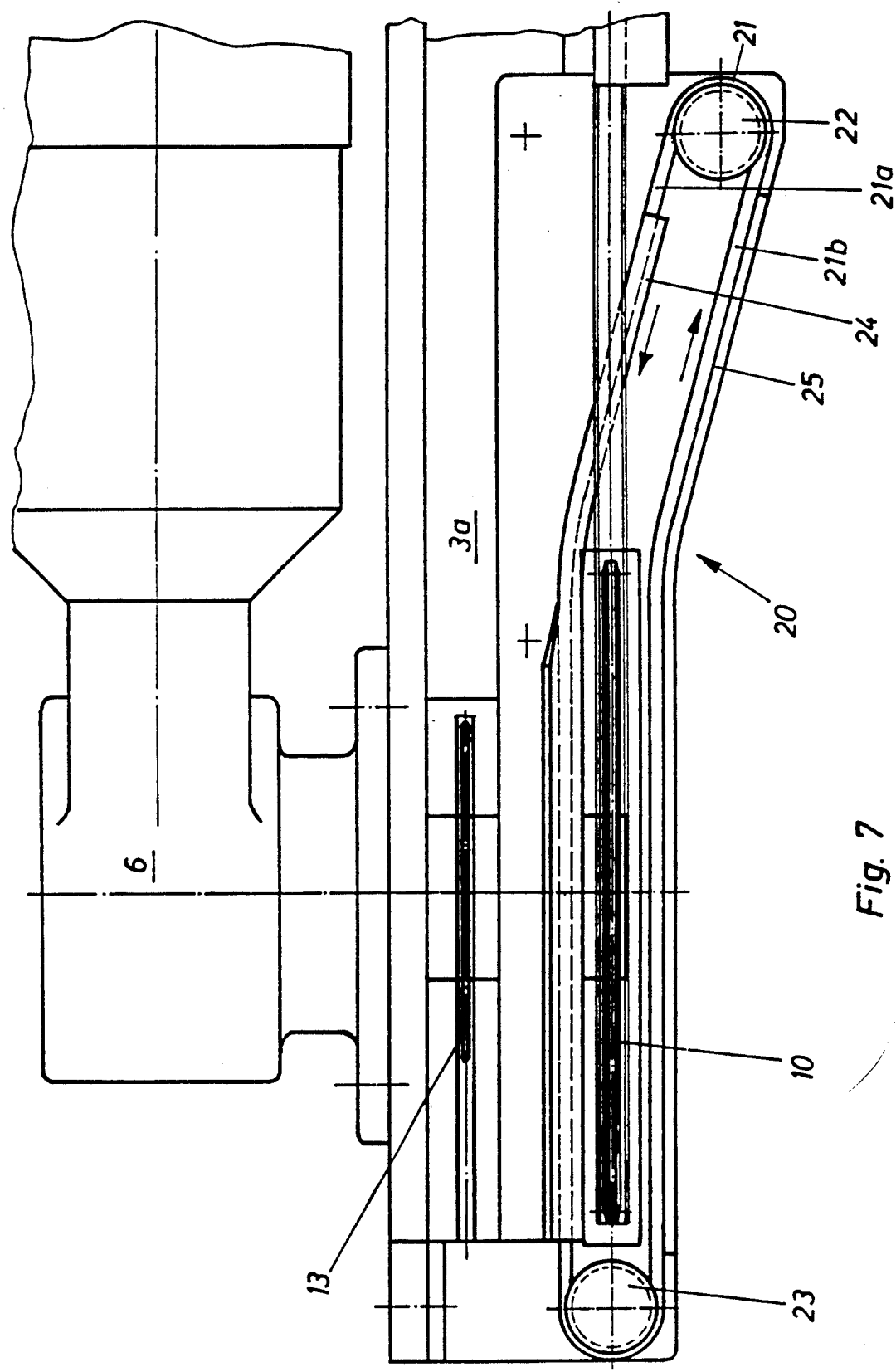
FIG. 7 is a partial enlargement of FIG. 1.

On the conveyor side of the base member 3, associated with the conveyor course 2a of the conveyor chain 2, a removal device 20 is arranged upstream from the head end and the removal point II. Referring especially to FIG. 7, the removal device 20 includes a conveyor belt 21, a drive pinion 23, a pinion 22, guide plates 24, 25 and gearing 26 (FIG. 5).

The removal device 20 is driven by a chain which travels over the drive gear 13 which is attached to the motor shaft 7, and over the input pinion 27 of the gearing 26. The gearing 26 is a simple bevel gearing having a vertically arranged input shaft 34 which is mounted in antifriction bearings 28, and bears the input pinion 27 and a bevel gear 32, and a horizontally arranged output shaft 35 which is also mounted in antifriction bearings 30, 31. The output shaft 35 bears a bevel gear 33, which is in engagement with the bevel gear 32, and the drive pinion 23.

In this embodiment the gear ratio is advantageously selected so that the conveyor belt 21 passes in the same direction as the conveyor chain 2, but at a higher speed.

As shown in FIG. 3, the conveyor belt 21, which is advantageously a belt which is toothed on both sides (FIG. 4), or at least one side, is arranged between the conveyor course 2a of the conveyor chain 2 which is provided for transporting hangers, and the base member 3 or more specifically the angle piece 3c which is flange-mounted on the modular head part 3a.

Thus, the toothed conveyor belt 21 travels over the pinions 22, 23 and is guided by guide plates 24, 25 attached to the angle piece 3c so that it runs from the pinion 22, which is mounted on the base member below the conveyor chain 2, obliquely upward past the plane of the conveyor chain 2, and then continues along a horizontal path parallel to the conveyor chain 2. Because the drive pinion 23 is arranged in the same vertical plane as the conveyor chain 2, the upper course 21a of the conveyor belt 21 extends in a plane located above the conveyor chain 2 and the lower course 21b extends in a plane located below the conveyor chain 2.

At the head end, following the removal device 20, with respect to the direction of transport T, a removal point II is formed by a slide rail 15 which extends in the direction of transport T. A starting section of the slide rail 15 is arranged in a plane above the toothed belt 21 and parallel to the latter, extending over the toothed belt in a direction opposite the direction of transport T over a certain length.

At a point substantially above the center of the drive pinion 23, the slide rail 15 is bent downward and forms an angled conveyor section of any desired shape, not shown here. The slide rail 15 is held on the base member 3 (or head part 3a) by means of a bracket 16.

At the loading point I, a rail 17, which comes obliquely from above and extends in a straight line in the direction of transport T, is attached to the base member 3 (or body part 3b) by means of a bracket 18.

The body part 3b is basically solid in cross-section (FIG. 6) with a continuous hole 19 arranged in the center. A pipe of suitable diameter (not shown) can be inserted into this hole 19 so that a plurality of body parts 3b can be arranged one behind the other and connected to each other by means of the pipe, namely as many as are necessary to produce the desired length of the storage conveyor. In a manner known to the person skilled in the art, positioning pins and holes (not shown here) may be provided on the adjacent connecting sides of the body parts 3b, to precisely position them and to prevent subsequent relative twisting.

At the end of the storage conveyor associated with the loading point I, an angle piece 36, on which the guide pinions 11, 12 are mounted via antifriction bearings (not shown), is screwed to the base member body part 3b which forms that end of the storage conveyor.

On the top side of the base member 3, recesses 37 are provided into which conventional screws—so-called Halfen screws 38—can engage in order to attach the storage conveyor to a ceiling by means of an angle iron 40, as indicated diagrammatically in FIG. 6.

The manner of operation of the storage conveyor of the invention will now be explained in greater detail:

Garments hanging on clothes hangers, coming from a supply conveyor section not shown here, slide via the slide rail 17 at the loading point I into the storage conveyor. The top region 1b of the hanger hook 1, substantially above its center of gravity, slides along the rail 17.

At the end of the slide rail 17, which extends in the direction of transport T beyond the center of the guide pinion 12, the hanger hook 1 drops onto the conveyor chain 2 (conveyor course 2a; see FIG. 6). The conveyor chain 2 now transports the hangers in the direction of the removal point II.

It is possible in this connection to operate the conveyor chain 2 cyclically, in order to store the hangers within the conveyor formed by the conveyor chain 2 and the base member 3, which in principle can be of any desired length.

The conveyor chain 2 now transports the hangers in the direction of the removal point II. Each hanger hook 1 is then engaged at its end 1a, which is spaced laterally from the center of gravity of the hanger 1, by the driven toothed belt 21 which extends obliquely upward and intersects the direction of transport T. The end 1a of the hanger engages into a recess between two teeth 21a (FIG. 4) of the toothed belt 21. Since the path of the toothed belt 21 is obliquely upward, the hanger hook 1 is lifted and comes out of engagement with the conveyor chain 2. The hanger hook 1 is lifted off of the conveyor chain 2 so that the top region 1b of the hanger hook 1 is lifted to a plane above the slide rail 15 (see FIG. 3). Once this level is reached, the hanger hook is transported horizontally until the hanger hook 1 is above the slide rail 15. As it moves further, the toothed belt 21 passes downward around the drive pinion 23 so that the top region 1b of the hanger hook 1 drops onto the slide rail 15. The hanger then is free to slide down along the slide rail 15.

Because the hanger 1 is lifted at its end 1a, at a point spaced laterally from the direction of transport T, the slide rail 15 can be disposed so as to allow the hangers to proceed linearly along the same direction of transport T as in the conveyor course 2a of the conveyor chain 2.

The speed of transport of the toothed belt 21 is advantageously greater than that of the conveyor chain 2, so when the hanger hooks are lifted off the conveyor chain 2, any bunched-together hangers are thereby simultaneously separated.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A storage conveyor for storing hangers incorporating hanger hooks, comprising:
    driven conveyor means; loading means at a loading point for feeding the hangers onto the conveyor means in a direction of transport;
    removal means at a removal point for removing hangers from the storage conveyor, said removal means raising the hangers continuously off of the conveyor means, while maintaining their previous direction of advance and maintaining at least their previous rate of advance, thereby placing the hangers in a position to be removed from the storage conveyor; and
    means for supporting and driving the removal means in the direction of transport, the removal means being conducted from below the conveyor means to above the conveyor means, passing adjacent to a portion of the conveyor means at an engagement point, and being guided so that it engages each hanger hook at the engagement point and thereby lifts such hanger off the conveyor means and onto the removal means.

2. A storage conveyor according to claim 1, further comprising means for supporting and driving said conveyor means substantially horizontally.

3. A storage conveyor according to claim 1, wherein said removal means transfers said hangers from said conveyor means to a slide rail adjacent to the removal means.

4. A storage conveyor according to claim 1, wherein said removal means increases the rate of advance of the hangers after raising them off the conveyor means, thereby increasing separation between the hangers.

5. A storage conveyor according to claim 1, wherein the removal means is toothed on at least a first side which engages the hanger hooks.

6. A storage conveyor according to claim 5, wherein the removal means is also toothed on a second side, which engages said means for driving the removal means.

7. A storage conveyor according to claim 1, wherein the removal means continues past said engagement point in the direction of transport and then moves substantially horizontally in a plane lying above the conveyor means.

8. A storage conveyor according to claim 7, wherein the removal means subsequently descends to below a slide rail at the removal point and transfers the hangers to the slide rail.

9. A storage conveyor according to claim 1, wherein the conveyor means is a roller chain.

10. A storage conveyor according to claim 1, wherein said removal means is located so as to engage the tips of the hanger hooks, with the hanger hooks being engaged by the conveyor means substantially at their apexes.

11. A storage conveyor for storing hangers incorporating hanger hooks, comprising:
    a driven conveyor device; loading means at a loading point for feeding the hangers onto the conveyor device in a direction of transport; and
    a removal device at a removal point for removing hangers from the storage conveyor, said removal device raising the hangers continuously off of the conveyor device, while maintaining their previous direction of advance and maintaining at least their previous rate of advance, thereby placing the hangers in a position to be removed from the storage conveyor; and
    means for supporting and driving the removal device in the direction of transport, the removal device being conducted from below the conveyor device to above the conveyor device.

12. A storage conveyor according to claim 11, wherein the removal device is guided adjacent to a portion of the conveyor device at an engagement point, and is guided so that it engages each hanger hook at the engagement point and thereby lifts such hanger off the conveyor device and onto the removal device.

13. A storage conveyor according to claim 12, wherein said removal device is guided obliquely past said engagement point.

* * * * *